C. A. BRYANT.
FASTENER.
APPLICATION FILED NOV. 3, 1910.

1,070,403.

Patented Aug. 19, 1913.

Witnesses:
N. McGuire
Ella J. Kruger

Inventor
Charles A. Bryant
By Redding, Greeley & Austin, Atty's.

UNITED STATES PATENT OFFICE.

CHARLES A. BRYANT, OF WAKEFIELD, MASSACHUSETTS, ASSIGNOR TO CONSOLIDATED SAFETY PIN COMPANY, OF BLOOMFIELD, NEW JERSEY, A CORPORATION OF NEW JERSEY.

FASTENER.

1,070,403.  Specification of Letters Patent.  Patented Aug. 19, 1913.

Application filed November 3, 1910. Serial No. 590,573.

*To all whom it may concern:*

Be it known that I, CHARLES A. BRYANT, a citizen of the United States, residing at Wakefield, in the State of Massachusetts, have invented certain new and useful Improvements in Fasteners, of which the following is a specification, reference being had to the accompanying drawing, forming a part hereof.

This invention relates to the construction of fasteners such as are used largely in connection with men's apparel, such as cuff fasteners, necktie fasteners, key-chain fasteners, etc., and comprises a U-shaped frame, a U-shaped spring within the frame, and a lever.

The object of the invention is to overcome certain weaknesses which exist in fasteners as heretofore constructed, to prevent the catching of the fabric to which the fastener is applied upon the teeth of the fastener when the fastener is open and to simplify and generally to improve the construction of such devices.

The invention will be more fully explained hereinafter with reference to the accompanying drawing in which it is illustrated and in which—

Figure 1:
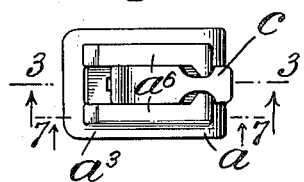
Figure 2:
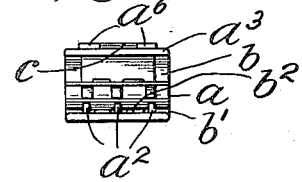
Figure 3:
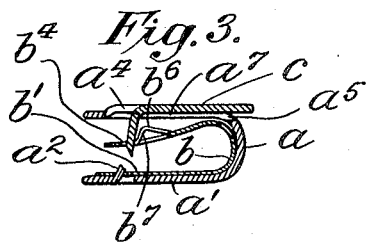
Figure 4:
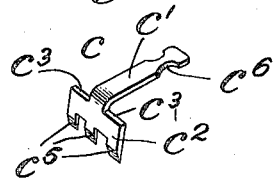
Figure 5:
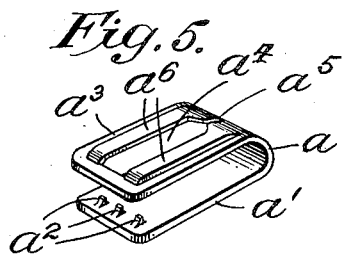
Figure 6:
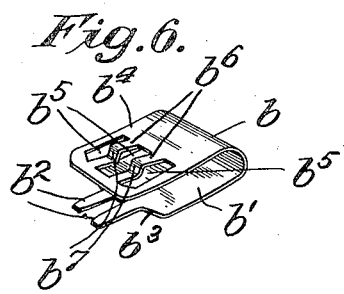
Figure 7:
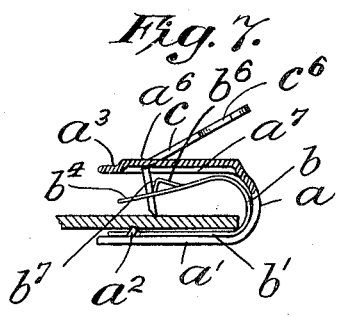
Figure 8:
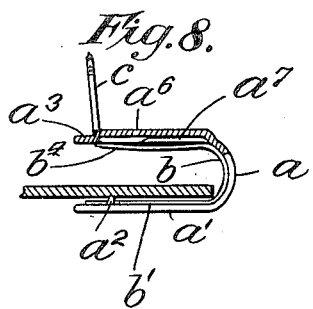

Figure 1 is a top view of the improved fastener. Fig. 2 is an end view thereof. Fig. 3 is a view in longitudinal section on the plane indicated by the line 3—3 of Fig. 1. Fig. 4 is a detail view in perspective of the lever. Fig. 5 is a detail view in perspective of the frame. Fig. 6 is a detail view in perspective of the spring. Fig. 7 is a view, partly in longitudinal section, on the plane indicated by the line 7—7 of Fig. 1, the parts being shown in intermediate positions. Fig. 8 is a view similar to Fig. 7 but showing the parts in the position which they assume when the fastener is completely open.

The U-shaped frame $a$, made of such material as will give the necessary stiffness, has the same general form as in other fasteners of like character. Its lower member $a'$ has lugs or teeth $a^2$ which are struck up inwardly and serve primarily to retain in position the spring hereinafter referred to. These lugs or projections are also preferably long enough to rise above the lower member of the spring so as to engage the fabric. When formed on the frame, they are stronger and therefore less liable to be broken off than if formed on the spring as in previous constructions. In the upper member $a^3$ of the frame is formed a long slot $a^4$ which extends from a point near the extremity of the upper member of the frame to the rear end of such upper member, being continued somewhat beyond the beginning of the curvature of the upper member, as at $a^5$, to receive the extremity of the lever, as hereinafter explained. The upper member is also struck up, as at $a^6$, along the sides of the slot $a^4$ to form ways for coöperation with the lever and also to form a recess $a^7$, in the underside of the upper member of the frame, in which the toothed part of the lever is housed when the fastener is completely open, as shown in Fig. 8.

The spring $b$ is U-shaped to fit within the frame $a$ and its lower member $b'$ is preferably formed with forwardly projecting fingers $b^2$ which lie between the lugs $a^2$ of the frame so as to prevent lateral displacement of the spring within the frame. The shoulders $b^3$ of the spring coöperate with the lugs $a^2$ to prevent longitudinal displacement of the spring. The upper member $b^4$ is slotted longitudinally, as at $b^5$, the slots being long enough to permit the teeth of the lever to pass through them when the lever is turned to the position shown in Fig. 8. Two intermediate bars $b^6$, between the slots, are struck up to form forwardly facing shoulders $b^7$ for a purpose to be described. The lever $c$ is bent substantially at right angles, as shown in Fig. 4, the member $c'$ thereof forming the handle which is of such width as to lie within the slot $a^4$ of the frame, while the head $c^2$, which has a width substantially equal to the width of the recess $a^7$ in the upper member of the frame, is formed with shoulders $c^3$ to coöperate with the upper member of the frame, and with teeth $c^5$ which are adapted to pass through the slots $b^5$ of the spring to engage the fabric, in preference to the usual arrangement in which the fabric engaging teeth are formed on the spring itself. The lever may be made of stock which is heavier and less brittle than that of the spring and the teeth are therefore less likely to be broken off than would be the case if they were formed on the spring.

When the frame, spring and lever are assembled, as shown in Figs. 1, 2, 7 and 8, and the fastener is completely open, as shown in Fig. 8, the lever stands with its angle close against the forward end of the slot $a^4$, the member $c^2$ lying in the recess in the upper part of the frame with its teeth $c^5$ lying between and outside of the struck up portions of the bars $b^6$, the lever being then held in this position by the shoulders $b^7$ which, rising into the recess $a^7$, stand between the teeth $c^5$ of the lever and prevent its rearward movement. As the lever is moved from the position shown in Fig. 8, through the position shown in Fig. 7, to the position shown in Fig. 3, the teeth $c^5$ are projected downwardly through the slots $b^5$ of the spring so as to engage the fabric, as shown in Fig. 7. Furthermore, since the longitudinal ways $a^6$ of the upper member of the frame permit the shoulders $c^3$ of the lower part $c^2$ of the lever to move freely to the rear, there is no tendency of the lever to thrust the fabric forward, as would be the case if the lever were provided as usual with trunnions which engage recessed bearings in the upper member of the frame and prevent such free movement of the upper part of the lever. When the fastener is completely closed, as shown in Figs. 1 and 3, the lever lies within the slot $a^4$ of the frame and its upper surface is level with the upper surface of the frame, instead of standing above it as is usually the case. As shown, the rear portion $a^5$ of the slot is narrower than the forward portion and the handle member of the lever is notched, as at $c^6$, to conform thereto.

It will be observed particularly that when the fastener is completely open, as shown in Fig. 8, there are no teeth projecting downward from the upper part of the fastener to catch the fabric, so that there is no danger of tearing or injuring the surface of even the most delicate fabric.

I claim as my invention:

In a fastener, the combination of a U-shaped frame having one member formed with teeth and the other member formed with a longitudinal slot with the adjacent portions struck up to form longitudinal ways, a U-shaped spring in the frame having longitudinal slots in the forward portion of its upper member with the intermediate bars struck up to form forwardly facing shoulders, and its lower member having shoulders to coöperate with said teeth to prevent displacement of the spring, and a substantially right angled lever comprising a handle member adapted to lie in said slot when the fastener is closed and having a head formed with shoulders to bear against said ways and to lie in the recess formed by said ways when the fastener is closed, and with teeth to project downwardly through the slots of the spring and coöperate with said first named teeth to engage the fabric, the teeth of the lever being guided in their movement from open to closed position by the forwardly facing shoulders of the spring.

This specification signed and witnessed this first day of November, A. D., 1910.

CHARLES A. BRYANT.

Witnesses:
 EDEN K. BOWSER,
 WILLIAM C. BROWN.

---

Copies of this patent may be obtained for five cents each, by addressing the "Commissioner of Patents, Washington, D. C."